Oct. 24, 1944.     J. E. PAUL     2,361,319
LUMINOUS MARKER
Filed Dec. 5, 1942
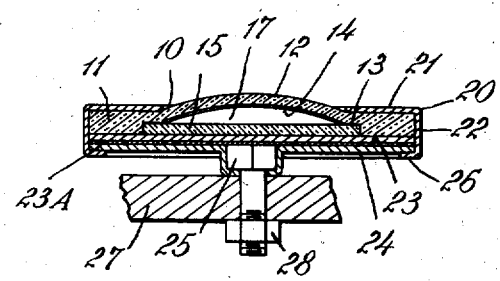
INVENTOR.
John E. Paul
BY
ATTORNEYS.

Patented Oct. 24, 1944

2,361,319

UNITED STATES PATENT OFFICE 2,361,319

LUMINOUS MARKER

John E. Paul, South Orange, N. J., assignor to United States Radium Corporation, New York, N. Y., a corporation of Delaware Application December 5, 1942, Serial No. 467,972

8 Claims. (Cl. 250—71)

This invention is concerned with luminous markers and particularly with self-activated luminous markers for military use. The invention contemplates improvements in radio-active luminous markers or badges which may be stationary or carried by soldiers or by vehicles or animals to mark location in the dark.

It has been proposed heretofore to produce luminous markers for military use in which a self-luminous pigment, such as zinc sulfide containing a radium salt, is enclosed in a transparent case, but a number of special problems are involved in the manufacture of such articles. The radio-active substances in the pigment decompose continuously and give off rays (which induce luminescence of the pigment) and emanations (particularly radon gas), which may be injurious to a variety of living organisms, including humans, unless proper precautions are taken to present a barrier that is substantially impenetrable to deleterious rays and emanations. Practically all transparent materials may be deleteriously affected by the rays and emanations. Under radium bombardment glass turns brown or violet so that its light transmission characteristics are badly impaired. Many transparent plastics are useless because they deteriorate under radium bombardment, particularly in the presence of moisture. Under radium bombardment, cellulose nitrate plastics discolor and develop a yellow-brown or gray or purple opacity; ethyl cellulose swells and discolors to the point of uselessness; cellulose acetate swells and acquires opacity of various colors; urea-formaldehyde resins become severely discolored; and most vinylite resins tend to swell, especially in the presence of moisture. Deterioration of plastics under radium bombardment is aggravated by outdoor exposure, and the continuation of sunlight and moist atmosphere characteristic of such exposure not only causes deterioration of the transparent materials, but may also bring about a darkening of the pigment itself or the binder employed with it, with resultant loss in luminous efficiency. However, as disclosed in my copending application Serial No. 413,106, filed October 1, 1941, organic thermo-plastic materials that are substantially non-absorbent with repsect to water are substantially unaffected by bombardment from a radio-active substance provided that the radio-active substance is enclosed in a dry space having a sub-atmospheric pressure.

It is, however, not always possible to establish and maintain the foregoing conditions, and as the result of my investigations, I have discovered other means for preventing the deterioration of military markers, etc., containing radio-active compounds. Thus, I have found that radio-active self-luminous substances, for example zinc sulfide pigment containing a radium salt, can be employed in a luminous marker having a container with a wall of transparent thermo-plastic organic material that is substantially non-absorbent with respect to water, without bringing about deterioration or discoloration of the material or of the pigment, provided that the radio-active substance is wet with a substance, preferably a high-boiling solvent which does not attack the thermo-plastic material substantially. I have found that under these conditions self-luminous radio-active substances show a marked improvement in resistance to the action of light, even though the space within the container is not maintained at sub-atmospheric pressure. Based upon this and related discoveries, I have developed an improved luminous marker which is safe, long-lived, rugged and durable and does not deteriorate or discolor substantially upon its exposure to wide extremes of weather conditions.

The preferred luminous marker of my invention comprises a hermetically sealed container, a mass of radio-active substance (such as finely divided radio-active zinc sulfide in a plastic binding medium) wet with a high-boiling organic solvent and disposed within the container, and a window in the container made of transparent organic thermo-plastic material that is substantially non-absorbent with respect to water and is substantially unattacked by the solvent, the window being of sufficient thickness to be impenetrable by emanations and alpha rays from the radio-active substance. Preferably, the interior of the container is at sub-atmospheric pressure and is not completely filled with the radio-active self-luminous material, so that there is a space in which some of the high-boiling organic solvent is present as vapor.

In my preferred structure, a radio-active pigment, for example zinc sulfide containing a radium salt, is sealed in a wet state between two discs of organic thermo-plastic material that is substantially non-absorbent with respect to water, the discs being relatively thick and bonded together thermo-plastically at their peripheries. At least a portion of one of the discs should be transparent to permit observation of the luminescence. Thus the front disc may be transparent and the back opaque.

A variety of organic materials may be employed in making the container for the luminescent pigment provided that the material is thermo-plastic and provided further that it has substantially no absorbent capacity for water and is substantially insoluble in the high-boiling solvent employed to wet the pigment. Examples of preferred thermo-plastic materials include polystyrene and acrylate plastics, none of which are altered substantially by radium bombardment from the pigment. Under the conditions existing in the marker of my invention, polystyrene resins and acrylate resins, such for example as methyl methacrylate, do not discolor or become opaque or swell.

A number of organic solvents may be employed to wet the radio-active material, provided that they are of high-boiling point, say in excess of 100° C. As indicated above, the organic solvent should not be such as to attack the thermoplastic material of the container and should be such that it will not evaporate completely from the radio-active substance, say zinc sulfide pigment, under the conditions existing during manufacture and subsequently in the sealed container. With polystyrene plastics, I prefer to employ solvents such as ethylene glycol monobutyl ether, diethylene glycol monobutyl ether, and ethylene glycol monoethyl ether. In the case of acrylate plastics, I prefer to employ ethylene glycol monobutyl ether. All of these solvents are of high-boiling point. The boiling-point of ethylene glycol monoethyl ether is not less than 128° C. at 760 millimeters Hg; the boiling-point of ethylene glycol monobutyl ether is not less than 163° C. at 760 millimeters Hg; and the boiling-point of diethylene glycol monobutyl ether is not less than 215° C. at 760 millimeters Hg.

Preferably, the luminous radio-active pigment and the wetting solvent are accompanied by a resinous binder which is soluble in the solvent.

Ordinarily, about two parts of luminous pigment (say radio-active zinc sulfide) will be suspended in about one part of a vehicle comprising a small proportion of a resin and a large proportion of one or more high-boiling solvents. For the manufacture of a marker in which the container is made from polystyrene discs, a suitable luminous composition is made with two parts of luminous zinc sulfide and one part of a vehicle composed of 75 grams of a resin, 150 grams of ethylene glycol monoethyl ether and 150 grams of ethylene glycol monobutyl ether. These ingredients are thoroughly mixed. The solvent tends to evaporate to some extent, but at room temperature and pressure the mixture will remain wet and is enclosed in the thermo-plastic container in the wet condition. For example, the luminous mixture may be applied to the inner or concave side of a dished polystyrene disc or lens or coated on a paper or metal disc to be inserted between the polystyrene discs. The plastic disc coated with the wet pigment mixture is then affixed to another polystyrene disc (which may or may not be transparent) or the coated disc is inserted between the two polystyrene discs, which in either case are then joined at the juxtaposed edges by heat and pressure. The application of the heat and pressure results not only in the formation of a hermetic seal between the edges of the two discs but also results in the creation of a reduced pressure in the space between the discs. The pressure in the space between the discs may be subatmospheric, but in any case the treatment tends to bring about the evaporation of some of the solvent with the result that the space contains vapor of the solvent.

For convenience in assembly, one of the discs, preferably the back disc, should be fitted into a depression in the other disc.

The assembled marker preferably is enclosed in an improved case which gives added security to the wearer, is easily assembled and forms a rugged structure that can be attached to a vehicle or any other carrier.

These and other features of my invention will be understood more thoroughly in the light of the following detailed description taken in conjunction with the accompanying single figure which is a section taken through a marker that is circular in plan.

Referring to the figure, it will be observed that the marker is provided with a circular front disc 10 having a thick annular flange 11 that surrounds a dished lens or window 12, all formed integrally of polystyrene. A flat annular seat 13 is provided within the flange on the concave side of the lens. A wet layer 14 of zinc sulfide paint made as described above by mixing radio-active zinc sulfide pigment with the vehicle of resin and high-boiling solvents is applied on the inside or concave surface of the lens by painting it directly thereon or on a paper insert. A simple polystyrene disc 15 is fitted into the seat in the first disc. If desired the edges of the second disc may be cemented into the seat of the first disc by a thermo-plastic bond formed by heating the edges of the two discs under pressure. In consequence of this method of sealing, a reduced pressure may be created in the space 17 between the discs.

The disc 10 or at least the lens or window thereof should be of clear plastic, but the back or second disk might not be transparent.

In assembling the apparatus shown in the drawing, the radio-active paint, i. e., a wet mixture containing two parts by volume of radio-active zinc sulfide pigment mixed with one part by volume of a vehicle comprising 75 grams of resin dissolved in 150 grams of ethylene glycol monobutyl ether and 150 grams of ethylene glycol monoethyl ether is applied on the concave side of the lens either directly or on a paper insert, so as to cover the inside surface of the disc 10, except for the flange end seat. Some slight evaporation of solvent from the paint disc is permitted, but the film should remain definitely wet. While the painted disc is still wet, the second or back disc is fitted in it. If desired, the two discs may be cemented together hermetically at this time. However, due to the improved construction of the case, such a cementing operation is not necessary, because the two discs are pressed firmly together in the case.

Referring again to the drawing, it will be observed that the case comprises a frame or bezel 20 which conveniently is a thin metal stamping, circular in plan and provided with a front section 21 that is cut out in a circle to permit exposure of the lens and a circular side wall 22 formed integrally with the front at right angles thereto.

After the two plastic discs have been assembled as described above, they are placed in the frame 20 with the lens facing out through the front. A thin circular piece 23 of sheet lead is placed in the case against the second disc; next a thin metal plate 23A is placed over the lead; and lastly the back of the case is inserted. This back 24 comprises a thick circular piece of sheet metal that is stamped at the center to form a recess that is non-circular, say square in plan, and which accommodates the head of a bolt 25, the shank of which extends through a hole in the bottom of the recess. The bolt-head fits relatively snugly into the recess so that it cannot turn. The steel plate 23A prevents the bolt head from being forced into the lead and plastic.

After the rear plate 24 has been fitted into the frame of the case, the back edge 26 of the case is crimped tightly over the back plate, the pressure exerted being sufficient to seal the two plastic discs together if this has not already been done.

The assembled marker, including the case may be fastened to any convenient structure 27 such as the chassis of a truck by means of a nut 28 on the bolt 25.

Markers made in accordance with my invention are substantially unbreakable and are unaffected by long exposure to water. The radio-active substance is thoroughly sealed so that the markers present no health hazard. At the same time, the discs and the case members and lead shield are sufficiently thick so that the alpha rays and emanations do not penetrate them, with the result that the radio-active efficiency of the marker is high. Thus the alpha rays (which are the principal factors in producing luminescence of the zinc sulfide) are effectively sealed within the structure and are not dissipated. Likewise, emanations (such as radon and thoron which in turn give off rays) are confined within the apparatus and so are usefully employed.

The markers of my invention may be made of various sizes. Conveniently, the marker described in conjunction with the drawing has an outside diameter of about 2½". The front disc 10 has an outside diameter of 2 1/8". It has a 1½" raised center or lens of clear optical polystyrene with a plus 6 diopter curve. The flange, i. e., the rim surrounding the lens, need not be optically clear. The flange on the front disc should be about .030" thick and the optically clear center or lens should be about .025" thick.

The back disc 13 is likewise made of polystyrene. This disc is flat and is about 0.25" thick.

The two discs enclose about 1200 milligrams of luminous zinc sulfide pigment in a non-discoloring resinous vehicle containing sufficient high-boiling organic solvent to keep the entire pigment mass wet. At the same time, the presence of the unvaporized solvent on the luminous zinc sulfide particles inhibits decomposition and discoloration of the plastic and also prevents the discoloration of the luminous material which normally takes place in the presence of ultra-violet light and water vapor.

I claim:

1. A luminous marker comprising a container, a wet mass of radio-active substance disposed within the container and a window in the container made of transparent organic thermo-plastic material that is substantially non-absorbent with respect to water, the window being of sufficient thickness to be impenetrable by emanations and alpha rays from the radio-active substance.

2. A luminous marker comprising a mass of radio-active pigment wet with a solvent having a boiling point above 100° C., a sealed relatively thick walled container within which the wet mass is disposed and made of organic thermo-plastic material that is substantially non-absorbent with respect to water and is substantially insoluble in the solvent, at least a portion of the container wall being transparent.

3. A luminous marker comprising a wet mass of finely divided radio-active substance containing a resinous binder, a container comprising two discs of organic thermo-plastic material that is substantially non-absorbent with respect to water, the discs being fitted together at their peripheries to enclose a space within which the wet mass is contained and of such thickness as to be impenetrable by alpha rays and emanations from the radio-active substance, at least a portion of the container wall being transparent.

4. A luminous marker comprising a mass of finely divided radio-active substance containing a resinous binder and wet with a high-boiling organic solvent having a boiling point above 100° C., a container comprising two discs of organic thermo-plastic material that is substantially non-absorbent with respect to water and is substantially insoluble in the solvent, the discs being hermetically sealed together at their peripheries to enclose a space within which the wet mass is contained and which also contains vapor of the high-boiling solvent, and the discs being of such thickness as to be impenetrable by alpha rays and emanations from the radio-active substance, at least a portion of the container wall being transparent.

5. A luminous marker comprising a hermetically sealed container, a mass of radio-active pigment wet with a high-boiling organic solvent selected from the group consisting of ethylene glycol monobutyl ether, diethylene glycol monobutyl ether and ethylene glycol monoethyl ether, and a window in the container made of transparent polystyrene thermo-plastic that is substantially non-absorbent with respect to water and is substantially unattacked by the solvent, the window being of sufficient thickness to be impenetrable by emanations and alpha rays from the radio-active pigment.

6. A luminous marker comprising a mass of radio-active pigment wet with ethylene glycol monobutyl ether, a hermetically sealed relatively thick walled container within which the wet mass is disposed and having a transparent window of acrylate thermo-plastic that is substantially non-absorbent with respect to water and is substantially insoluble in the solvent.

7. A luminous marker comprising a hermetically sealed container, a mass of radio-active substance wet with a high-boiling organic solvent having a boiling point above 100° C. disposed within the container and a window in the container made of transparent organic thermo-plastic material that is substantially non-absorbent with respect to water and is substantially unattacked by the solvent, the window being of sufficient thickness to be impenetrable by emanations and alpha rays from the radio-active substance, and the interior of the container being at sub-atmospheric pressure.

8. A luminous marker comprising a wet mass of finely divided radio-active substance containing a resinous binder, a container comprising two discs of organic thermo-plastic material that is substantially non-absorbent with respect to water, the discs being fitted together at their peripheries to enclose a space within which the wet mass is contained and of such thickness as to be impenetrable by alpha rays and emanations from the radio-active substance, the front disc of the container being transparent, at least in its central portion, a lead plate disposed against the back disc, and a sheet metal case enclosing the container and the lead plate and having a cut out bezel adjacent the front disc.

JOHN E. PAUL.